United States Patent
Wong

(10) Patent No.: US 10,750,666 B2
(45) Date of Patent: Aug. 25, 2020

(54) DISPENSER FOR DISPENSING WATER AND FERTILISER

(71) Applicant: Self Irrigation System Limited, Sham Shui Po, Kowloon (HK)

(72) Inventor: Kam Hoi Wong, Kowloon (HK)

(73) Assignee: Self Irrigation System Limited, Sham Shui Po, Kowloon (HK)

( * ) Notice: Subject to any disclaimer, the term of this patent is extended or adjusted under 35 U.S.C. 154(b) by 64 days.

(21) Appl. No.: 16/074,795

(22) PCT Filed: Feb. 3, 2017

(86) PCT No.: PCT/CN2017/072812
§ 371 (c)(1),
(2) Date: Aug. 2, 2018

(87) PCT Pub. No.: WO2017/133656
PCT Pub. Date: Aug. 10, 2017

(65) Prior Publication Data
US 2019/0037767 A1    Feb. 7, 2019

(30) Foreign Application Priority Data

Feb. 3, 2016   (GB) .................................. 1601906.9

(51) Int. Cl.
*A01C 23/04*    (2006.01)
*A01G 25/06*    (2006.01)
(Continued)

(52) U.S. Cl.
CPC ............ *A01C 23/042* (2013.01); *A01C 23/00* (2013.01); *A01G 25/02* (2013.01); *A01G 25/06* (2013.01); *A01G 25/026* (2013.01); *B05B 1/20* (2013.01)

(58) Field of Classification Search
CPC ........ A01C 23/00; A01C 23/04; A01C 23/042; A01G 25/02; A01G 25/023; A01G 25/026; A01G 25/06; B05B 1/20
(Continued)

(56) References Cited

U.S. PATENT DOCUMENTS 3,726,304 A    4/1973   Cook
3,876,146 A *  4/1975   Pacheco ................. A01G 25/02
                                                      239/145

(Continued)

FOREIGN PATENT DOCUMENTS

CN      201064743      5/2008
CN      203775679      8/2014
(Continued)

OTHER PUBLICATIONS

State Intellectual Propery Office of the P.R. China; International Search Report; dated Apr. 24, 2017.

*Primary Examiner* — Darren W Gorman
(74) *Attorney, Agent, or Firm* — Price Heneveld LLP

(57) ABSTRACT

A dispenser for simultaneously dispensing water and fertiliser comprising: a chamber having a chamber wall which is at least partially water permeable; a fertiliser supply line having a fertiliser supply line wall; a water supply line having a water supply line wall, the water supply line wall having at least one aperture extending through the wall; the water supply line and the fertiliser supply line being arranged within the chamber; and at least one dispensing head comprising one or more outlets; wherein the at least one dispensing head extends through the fertiliser supply line wall and the water permeable wall of the chamber.

25 Claims, 7 Drawing Sheets

(51) Int. Cl.
    *A01G 25/02*     (2006.01)
    *A01C 23/00*     (2006.01)
    *B05B 1/20*     (2006.01)

(58) Field of Classification Search
    USPC .......................................................... 137/268
    See application file for complete search history.

(56)                 References Cited

U.S. PATENT DOCUMENTS

| | | | |
|---|---|---|---|
| 4,881,568 | A | 11/1989 | Ho |
| 5,335,690 | A | 8/1994 | Worth |
| 5,730,364 | A * | 3/1998 | Gertie ................... A01G 25/06 |
| | | | 239/201 |
| 5,735,470 | A | 4/1998 | Ohe et al. |
| 5,927,610 | A * | 7/1999 | Dutcher ............... A01C 23/042 |
| | | | 137/268 |
| 2006/0108376 | A1* | 5/2006 | Muir .................... A01C 23/042 |
| | | | 222/129 |
| 2014/0124045 | A1 | 5/2014 | Gilmore et al. |
| 2017/0245424 | A1* | 8/2017 | Lee ...................... A01C 23/042 |

FOREIGN PATENT DOCUMENTS

| | | |
|---|---|---|
| GB | 1436444 | 9/1973 |
| GB | 2447377 | 9/2008 |
| HK | 1090253 | 12/2006 |
| JP | 2001045819 | 2/2001 |
| JP | 2012254028 | 12/2012 |
| WO | 2004107840 | 12/2004 |

\* cited by examiner

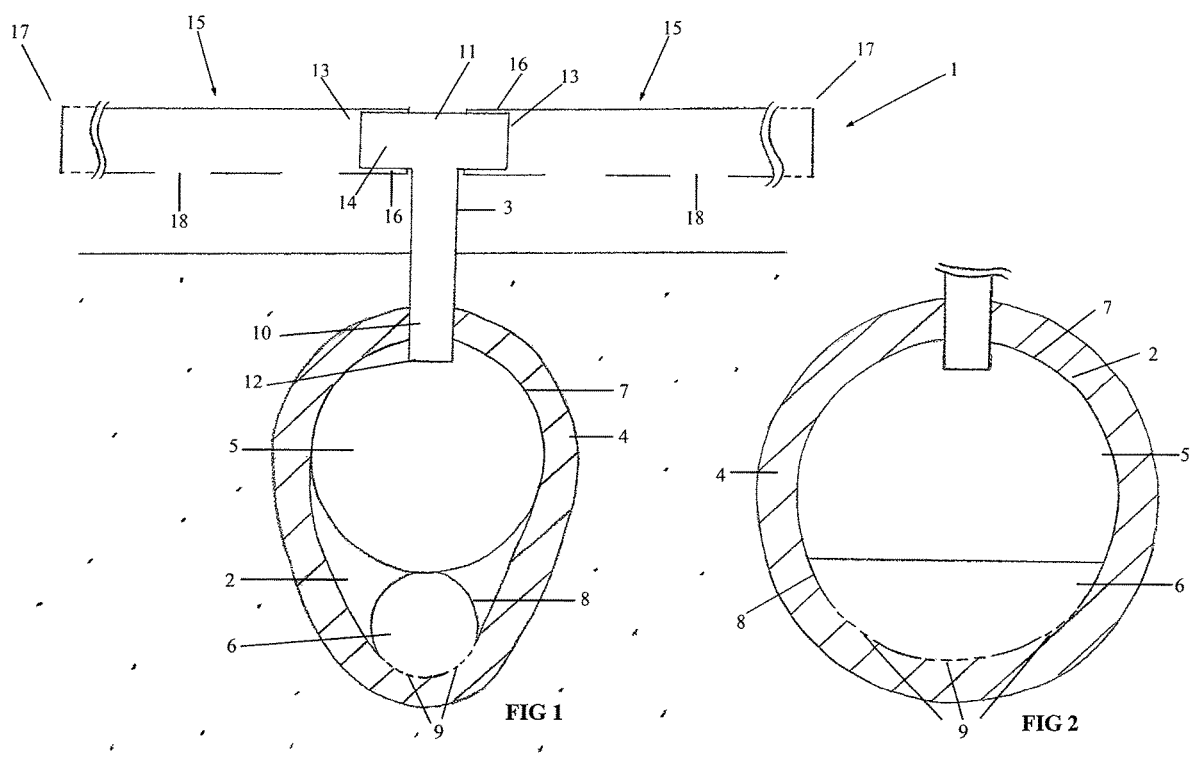

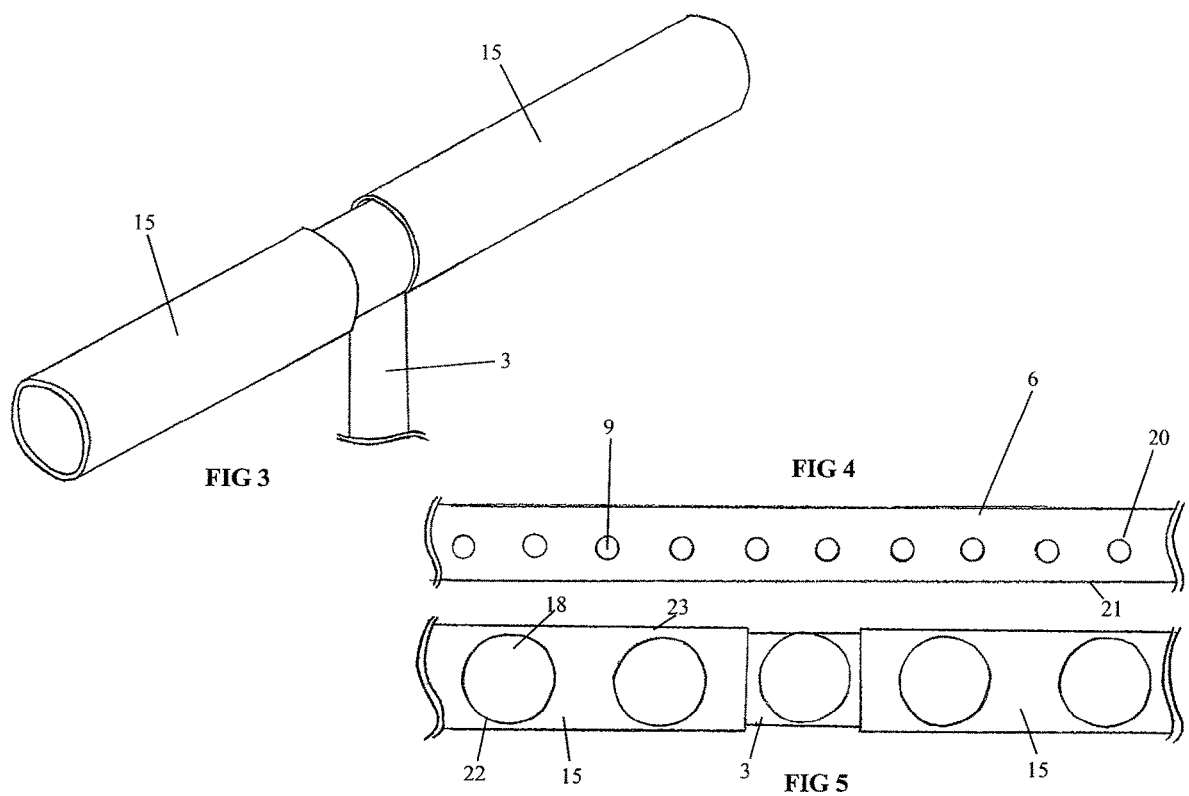

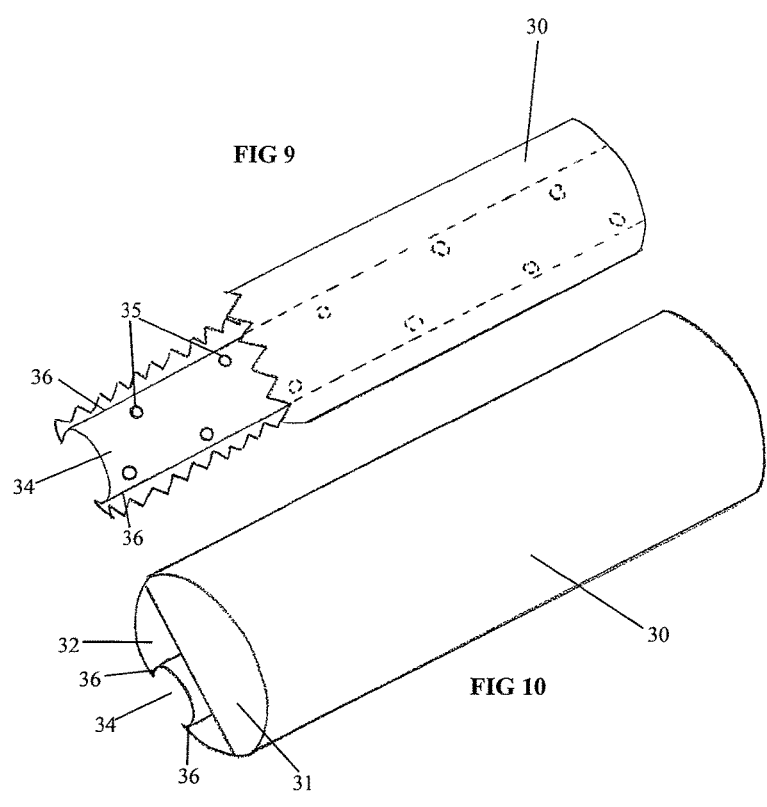
FIG 9
FIG 10
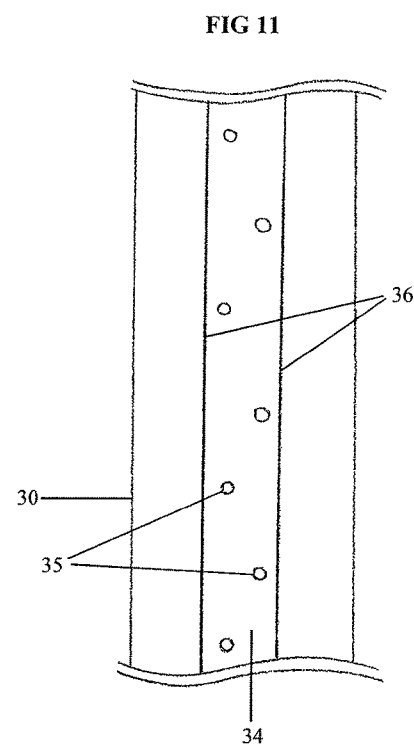
FIG 11

FIG 12
FIG 13
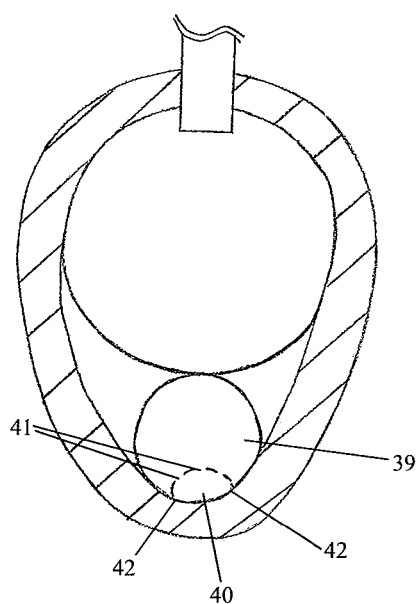
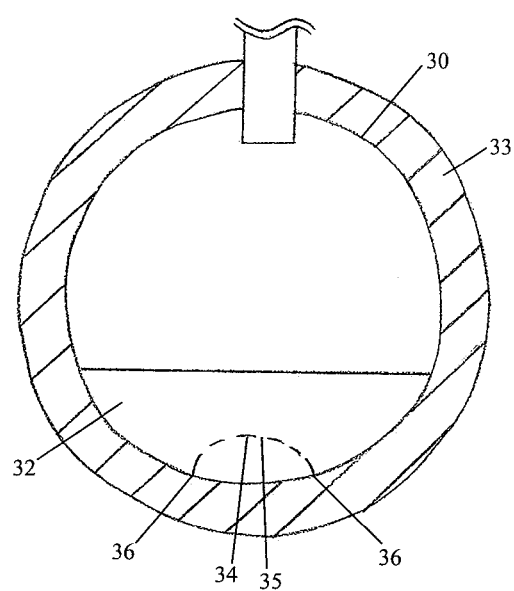

DISPENSER FOR DISPENSING WATER AND FERTILISER

BACKGROUND OF THE INVENTION

The present invention relates to a dispenser for water and aqueous fertiliser capable of or sequentially simultaneously dispensing water and fertiliser. More particularly but not exclusively, the present invention relates to a dispenser for the simultaneous dispensing of fertiliser above ground level and water below ground level.

It is common practice when fertilising an area of soil to first dispense aqueous fertiliser onto the soil surface. Following application of fertiliser, water is then applied to the soil to facilitate further diffusion of the fertiliser into the soil.

Fertilisation of a lawn may also be achieved through use of a sprinkler system. Here, liquid fertiliser and water are added to the sprinkler. The resulting solution is subsequently expelled under pressure through a sprinkler head.

A problem associated with these practices is that too much water can be applied to the surface of the soil which may result in leaching of the fertiliser. This is clearly detrimental to the efficiency of the fertilisation procedure.

In addition, when dispensing a fertiliser by hand there is often a delay before applying the water. This may result in scorching of the foliage. It will be appreciated that scorching will occur more quickly in sunny or hot conditions.

Fertilising an area of soil with the aid of a sprinkler system has the further disadvantage that there is often insufficient water within the spume to allow for diffusion of fertiliser into the soil. This may also lead to scorching of foliage.

The present invention seeks to address the problems of the prior art.

SUMMARY OF THE INVENTION

Accordingly the present invention provides:

a water and fertiliser dispenser capable of simultaneously and sequentially dispensing water and aqueous fertiliser comprising:

a chamber having a chamber wall which is at least partially water permeable;

a fertiliser supply line having a fertiliser supply line wall;

a water supply line having a water supply line wall, the water supply line wall having at least one aperture extending through the wall;

the water supply line and the fertiliser supply line being arranged within the chamber; and at least one dispensing head comprising one or more outlets;

wherein the at least one dispensing head extends through the fertiliser supply line wall and the water permeable wall of the chamber.

The fertiliser may comprise an aqueous solution or dispersion of soluble or insoluble nutrients. Preferably a solution is employed.

The dispenser allows for concurrent or sequential dispensing of aqueous fertiliser and water above and below ground, respectively. The water and fertiliser may be dispensed at the same time. Alternatively the water may be dispensed after the aqueous fertiliser has been applied to the ground surface in order to wash the fertiliser into the ground. This prevents leaching of fertiliser and scorching of grass where present. In use, the chamber is located beneath the soil and the at least one dispensing head protrudes above the surface of the soil.

The wall of the chamber may comprise an annular or tubular sleeve composed of a body of open cellular material. The open cellular material allows for even transport of water across the sleeve. The open cellular material also helps to negate compressive forces directed towards the water and fertiliser supply lines and also protects the supply lines from damage during installation or during use, for example during removal of weeds.

Alternatively, the chamber wall may be composed of woven or non-woven textile or cloth material.

The chamber wall may comprise a plurality of conduits or porous regions.

The chamber wall may comprise a series of conduits. The conduits enable the channeling of water to specific locations within the wall. These specific locations will accordingly expel more water in comparison to areas which do not have conduits connected to them.

The chamber wall may comprise regions of water impermeable material. The water impermeable material may direct water to specific locations within the wall. These specific locations will accordingly expel more water.

The chamber wall may be tapered at one end. Preferably the lower end of the chamber wall is tapered in cross sectional view.

The fertiliser supply line may have a diameter in the range of 1 cm to 10 cm. Alternatively, the fertiliser supply line may have a diameter in the range of 2 cm to 8 cm.

A fertiliser supply line having a smaller diameter will restrict the amount of fertiliser expelled in a given period. In addition, a fertiliser supply line having a smaller diameter will expel liquid fertiliser under increased pressure which facilitates the dispensing heads in dispensing liquid fertiliser. Increasing the pressure may also facilitate the dispensing heads in applying liquid fertiliser over a greater surface area.

Alternatively, a fertiliser supply line having an increased diameter will enable an increased volume of fertiliser to be expelled over a given period. Accordingly, a fertiliser supply line having a larger diameter will expel liquid fertiliser under a reduced pressure, when compared to fertiliser supply lines exhibiting narrower diameters. Applying liquid fertiliser under reduced pressure will facilitate the dispensing heads in dispensing liquid fertiliser over a decreased surface area avoiding wastage. However, use of higher pressure fertiliser supply line reduces any risks of blockage by particulate matter in the dispensing head. Therefore pressure may be selected to optimise these properties.

The fertiliser supply lines may have a releasable connector configured to be disconnected from the dispenser. Additional fertiliser supply lines with larger or smaller diameters may be attached to the dispenser to enable fertilisation of a large or small area of land, respectively.

The fertiliser supply line wall may be composed of an elastomeric material.

The water supply line may have a diameter in the range of 1 cm to 8 cm. Alternatively, the water supply line may have a diameter in the range of 2 cm to 4 cm.

A water supply line having a smaller diameter will restrict the amount of water expelled in a given period. In addition, a water supply line having a smaller diameter will expel water under increased pressure. This will result in water entering the wall of the chamber at an increased velocity. Consequently, water will exit the wall at an increased velocity and will penetrate deeper into the soil. This will increase the amount of soil exposed to water.

Alternatively, a water supply line having an increased diameter will enable an increased volume of water to be expelled over a given period. Accordingly, a water supply line having a larger diameter will expel water under a reduced pressure, when compared to water supply lines exhibiting narrower diameters. Applying water under reduced pressure will result in a decrease in the amount of soil which is exposed to water.

The water supply lines may be provided with a releasable connector configured to allow the line to be disconnected from the dispenser. Additional water supply lines with larger or smaller diameters may be attached to the dispenser to enable irrigation of a large or small area of land, respectively.

The water supply line wall may be composed of an elastomeric material.

The water supply line may have a semi-cylindrical outlet duct. The duct may have a downwardly opening aperture to form a downwardly opening channel which may have parallel sides. The channel may be rectangular in plan view. The duct may have downwardly extending lips. The longitudinal edges of the duct may have downwardly facing lips to shield the water outlet apertures from ingress of soil or other debris in use. The semi-cylindrical or partially cylindrical duct provides a self-cleaning arrangement to extend the working life of the dispenser when buried below ground level.

In a preferred embodiment, the water supply line and fertiliser supply line are separate from one another. Separation of the water and fertiliser supply lines allows a user to change a water supply line without the need to replace the fertiliser supply line, and vice versa.

In an alternative embodiment, the water supply line and fertiliser supply line are separated by a water impermeable barrier. Such a configuration will reduce the amount of material used during manufacture and will accordingly reduce associated manufacturing costs.

In a preferred embodiment, the water supply line is located underneath the fertiliser supply line, when in use. In alternative embodiments, the water supply line may be located to the side of the fertiliser supply line, when in use.

In an advantageous embodiment, the fertiliser supply line is located above and has a greater diameter than the water supply line, the chamber covering both supply lines.

In such an arrangement, the fertiliser supply line shields the water supply line from the heat of sun. The fertiliser supply line may be filled with water intermittently when fertiliser application is required, for example weekly, but the water supply line may be filled more frequently, for example daily. For this reason, water losses from the water supply line may be more severe so that shading of the water supply line is advantageous. The fertiliser supply line may provide a covering for the upwardly facing parts of the water supply line. This may reduce upward flow of water and may thereby cause water flow to be directed downwardly into the ground, reducing losses due to evaporation and promoting strong, downward root growth.

Furthermore, an upper surface of the chamber having a greater lateral width reduces a likelihood that it can be accidentally dislodged from the ground, for example during cultivation of adjacent crops.

The dispenser head may extend upwardly from the fertiliser supply line, so that the outlets may be located above the ground surface in use. The dispenser head may comprise an outlet member or tubular adapter having a multiplicity of outlet apertures, for example spray nozzles. The dispensing head may further comprise one or more sprinkler adaptors configured to connect an outlet of the adaptor, the sprinkler adaptor comprising a multiplicity of outlet apertures.

The outlet member may be mounted on a support pipe extending upwardly from the fertiliser supply line. The outlet member may extend generally horizontally from the support pipe. The member and support pipe may have a T-shaped configuration.

The dispenser head outlets may be located on the side of the dispenser head and may be directed horizontally or upwardly. This will enable liquid fertiliser to be expelled in a horizontal direction to a maximum distance from the head.

Alternatively, the dispenser outlets may be located at the top of the dispenser head. This will enable liquid fertiliser to be expelled in a vertical or diagonal direction.

The outlet member apertures may be located on the side of the outlet member and may be directed horizontally or upwardly. This will enable liquid fertiliser to be expelled in a horizontal direction to a maximum distance from the outlet member.

Alternatively, the outlet member apertures may be located at the top of the outlet member. This will enable liquid fertiliser to be expelled in a vertical or diagonal direction.

The dispensing head may further comprise one or more adaptors which are configured to connect to the one or more outlets of the dispenser head. The sprinkler adaptors comprise at least one outlet.

The outlet member may further comprise one or more adaptors which are configured to connect to the apertures of the outlet member. The sprinkler adaptors comprise at least one outlet The adaptors may be configured to alter the direction at which liquid fertiliser is expelled. The adaptors may also be configured to restrict the liquid flow rate in order to pressurise the liquid fertiliser before expulsion.

In a preferred embodiment, the adaptors have an elongate tubular configuration. This configuration allows for liquid fertiliser to contact a greater surface area of soil.

The at least one dispensing head may extend into the chamber. This may provide greater stability of the dispenser head.

The at least one dispenser head may be arranged to rotate in use. The at least one dispenser head may be configured to rotate axially. This will enable liquid fertiliser to be applied to a greater surface area of soil.

The at least one aperture of the water supply line may have a diameter in the range of about 0.5 mm to about 2 mm. Alternatively, the water supply line may have a diameter of about 1 mm.

A water supply line having apertures with a relatively small diameter will expel water under an increased pressure. This will result in water entering the wall of the chamber at an increased velocity. Accordingly, water will exit the wall at an increased velocity and will penetrate deeper into the soil. This allows for an increased amount of soil to be exposed to water.

The at least one aperture of the water supply line may be concealed by the wall of the chamber. The at least one aperture of the water supply line may be at least partially covered by the wall of the chamber. This will allow for water to be pumped directly into the wall of the chamber. Consequently, pressure will intensify at the water entry point which facilitates distribution of water to the remainder of the wall. This will result in expulsion of water from the wall in a uniform manner.

The at least one aperture of the water supply line may be partially concealed by the wall of the chamber.

The dispenser may comprise a series of chambers, wherein each of the water supply lines may be further connected to a main water supply line, and wherein each of the fertiliser supply lines may be connected to a main fertiliser supply line.

The water supply line may be connected to a cistern adapted to provide a constant head of water to the supply line.

The arrangement of the present invention wherein the water and liquid fertiliser supply lines are buried beneath the ground surface in use, but with the fertiliser dispensing heads located above the ground is particularly advantageous.

The liquid supplies are protected from solar heating by the overlying soil but the dispensing heads are exposed, facilitating cleaning, for example, by scraping or using a hose. The fertiliser may comprise an agricultural waste stream containing particulate matter which can accumulate on the dispenser outlets, causing eventual blockage. In the present invention, the fertiliser line may be connected occasionally to a main water supply to flush out the accumulated waste when necessary. Also, the fertiliser is applied to the top layer of soil where it will not be washed away by the water supply lines beneath the ground surface. Furthermore, a worker can observe and monitor the amount and homogeneity of fertiliser applied to the ground surface.

Location of the water supply line below the usually empty fertiliser supply line produces a more stable structure from which the upstanding dispensing heads may be securely supported.

BRIEF DESCRIPTION OF THE DRAWINGS

The invention is further described by means of example but not in any limitative sense, with reference to the accompanying drawings, in which:

FIG. 1 shows a partial cross-sectional view of the dispenser chamber and dispensing head;

FIG. 2 shows a partial cross-sectional view of the chamber with an alternative fertiliser and water supply line configuration;

FIG. 3 is a perspective view of the dispensing head engaged with a pair of elongate tubular adaptors;

FIG. 4 is a view of the water supply line from below;

FIG. 5 is part cross-sectional view of the dispensing head from below engaged with the pair of elongated tubular adaptors;

FIGS. 9 and 10 show an alternative supply line in accordance with this invention.

FIG. 11 shows the supply line of FIG. 10 from below.

FIG. 12 shows a partial cross-sectional view of the chamber with an alternative fertiliser and water supply line configuration; and FIG. 13 shows a partial cross-sectional view of the chamber with an alternative fertiliser and water supply line configuration.

DETAILED DESCRIPTION OF THE INVENTION

Figure 6:
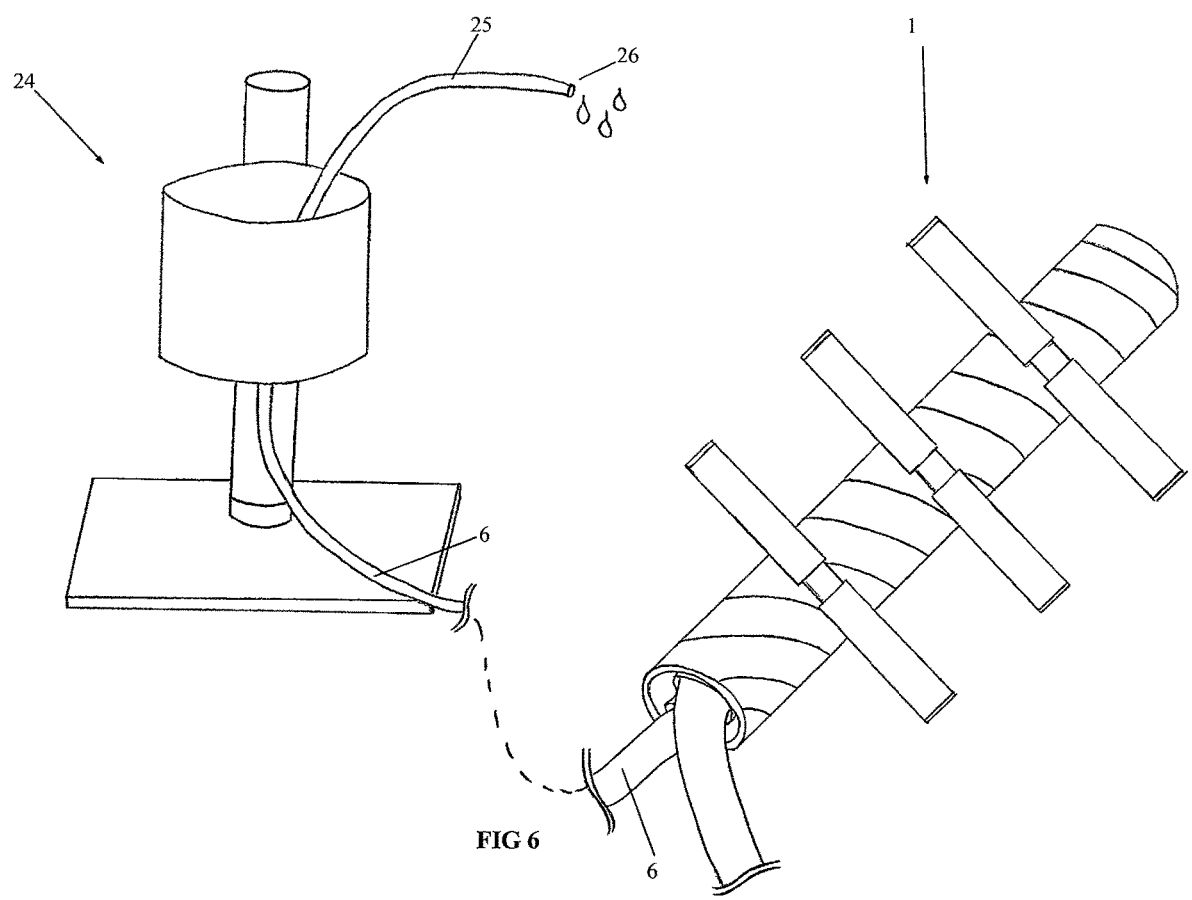
FIG. 6 is a perspective view of the dispenser attached to a cistern.

FIG. 1 shows a dispenser 1 comprising a chamber 2 and dispensing head 3. The chamber is defined by a wall 4. The wall 4 consists of an annular sleeve composed of a cellular foam material which is water permeable. A fertiliser supply line 5 and water supply line 6 are located within the chamber 2. The fertiliser supply line 5 and water supply line 6 each has a tubular configuration. The water supply line 6 has a cross-sectional diameter which is less than that of the fertiliser supply line 5. The water supply line 6 and fertiliser supply line 5 partially define the perimeter shape of the wall 4. The fertiliser supply line 5 has a fertiliser supply line wall 7 which is impermeable to liquid. The water supply line 6 has a water supply line wall 8 which is impermeable to liquid. The water supply line 6 has a plurality of apertures 9 extending through the water supply line wall 8. The plurality of apertures 9 are at least partially covered or concealed by the water supply line wall 8. The dispensing head 3 is of a T shaped configuration and comprises first 10 and second 11 ends. The first end 10 extends through the water permeable wall 4 of the chamber 2 and the fertiliser supply line wall 7. The first end 10 of the dispensing head 3 comprises an opening 12. The second end 11 of the dispensing head 3 comprises a pair of diametrically opposed outlets 13 located on the T shaped cross-member 14. A pair of elongate tubular adaptors 15 are located on either end of the T shaped cross member 14. The elongated tubular adaptors 15 comprise an open first end 16, a closed second end 17 and a series of outlets 18. The outlets 18 are located on the underside of the elongate tubular adaptors 15. The open first end 16 of each of the elongate tubular adaptors 15 are configured to mount on the sides of the T cross-member 14. Mounting of the elongate tubular adaptors 15 results in the outlets 13 of the T cross-member 14 being located within the elongate tubular adaptors 15.

FIG. 2 shows the chamber 2 with an alternative fertiliser 5 and water 6 supply line configuration. The fertiliser supply line 5 and water supply line 6 define the perimeter shape of the wall 4. The fertiliser supply line 5 has a fertiliser supply line wall 7 which is impermeable to liquid. The water supply line 6 has a water supply line wall 8 which is impermeable to liquid. The water supply line 6 and fertiliser supply line 5 are separated by a barrier wall 19 which is impermeable to liquid. The water supply line 6 has a plurality of apertures 9 extending through the water supply line wall 8. The plurality of apertures 9 are concealed by the water supply line wall 8.

FIG. 3 shows the dispensing head 3 engaged with the pair of elongate tubular adaptors 15.

FIG. 4 shows the underside of the water supply line 6 with the plurality of apertures 9. The edge 20 of each of the apertures 9 are located distal from the outer perimeter 21 of the water supply line 6.

FIG. 5 shows the underside of the dispensing head 3 engaged with the pair of elongate tubular adaptors 15. The edge 22 of each of the outlets 18 are located proximal to the outer perimeter 23 of the elongate tubular adaptors 15.

FIG. 6 shows the water supply line 6 of the dispenser 1 attached to a cistern 24. The cistern 24 is attached to a second water supply line 25. The second water supply line 25 has a free end 26 which is adapted to attach to a mains water supply (not shown).

Figure 7:
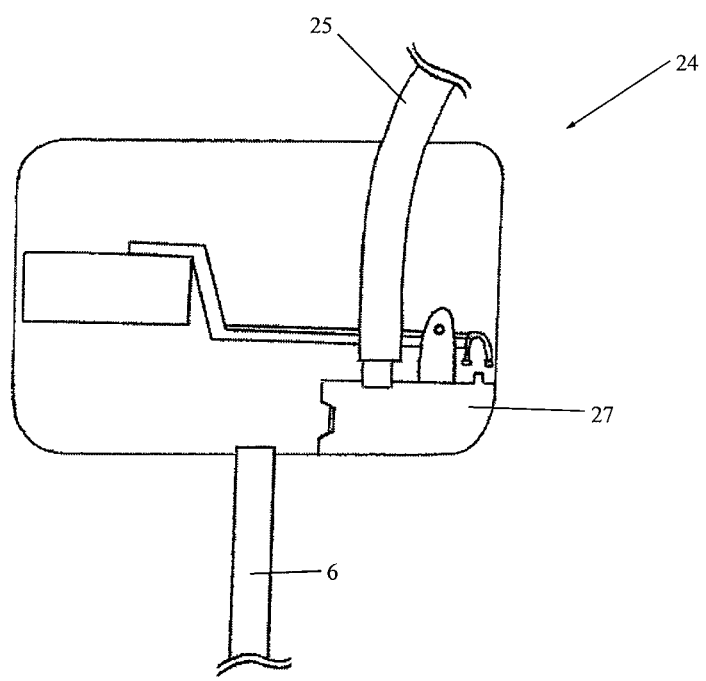
FIG. 7 is a part cross-sectional side view of the dispenser attached to a cistern.

FIG. 7 shows the water supply line 6 of the dispenser 1 attached to a cistern 24. A second water supply line 25 is connected to a float valve system 27 contained within the cistern 24.

Figure 8:
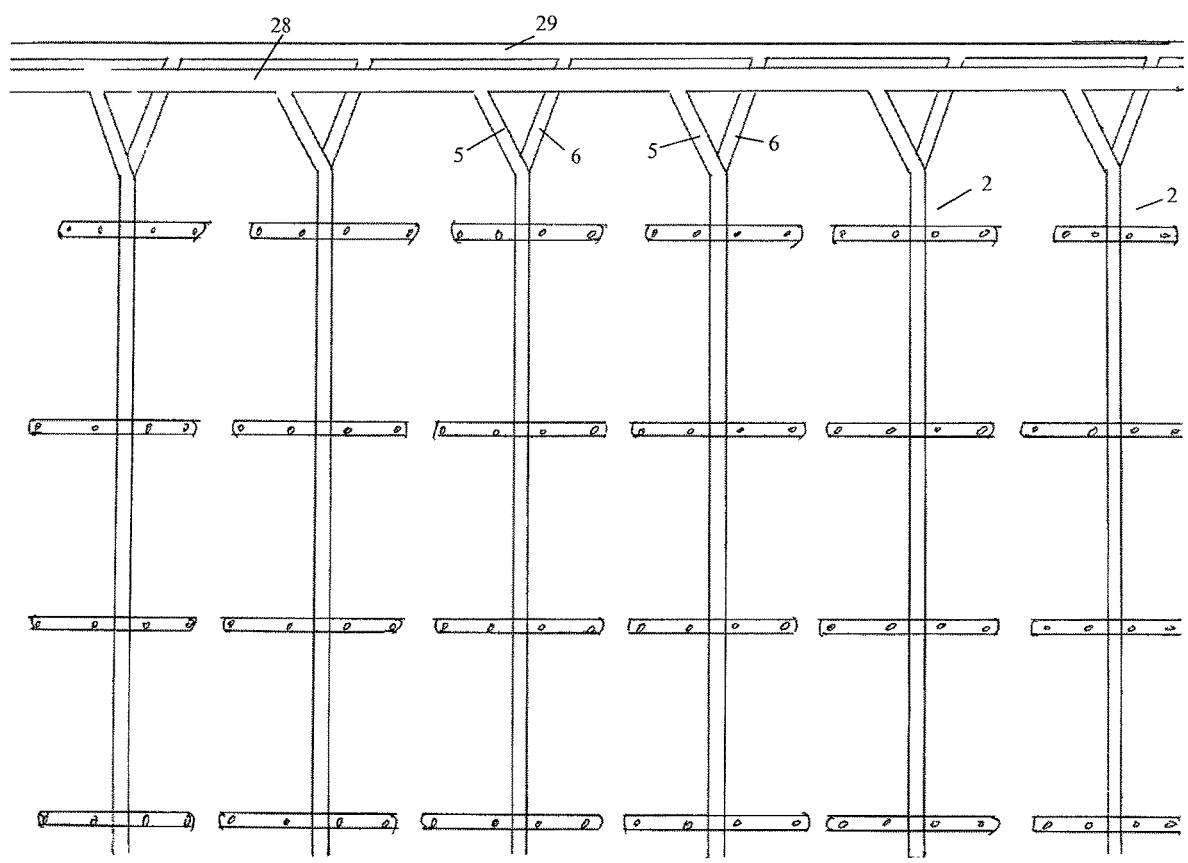
FIG. 8 is schematic view of a series of dispensers, water supply lines and fertiliser supply lines interconnected to a main water supply line and a main fertiliser supply line.

FIG. 8 shows an array comprising a series of dispensers 2 arranged to provide coverage of a ground surface from fertiliser supply lines 5 and water supply lines 6. The fertiliser supply lines 5 and water supply lines 6 are connected to a main fertiliser supply line 28 and a main water supply line 29, respectively.

In use, with reference to FIGS. 1 to 8, each chamber 2 is positioned under the ground surface whilst each dispensing head 3 is located above the ground surface. Liquid fertiliser and water are pumped concurrently into the fertiliser supply line 5 and water supply line 6, respectively. Water exits the water supply line 6 through the apertures 9 and flows into the wall 4 of the chamber 2. Water is then expelled from the wall 4 into the surrounding soil. In contrast, liquid fertiliser flowing through the fertiliser supply line 5 enters the dispensing head 3 through the openings 12 of the dispensing head(s) 3. The liquid fertiliser then flows through the diametrically opposed outlets 13 located on the T cross-member 14 and into the elongate tubular adaptors 15. The liquid fertiliser then exits through the outlets 18 of the elongate tubular adaptors 15. Upon exit from the outlets 18, the liquid fertiliser is deposited onto the surface of the soil.

FIGS. 9 to 11 illustrate an alternative embodiment of the invention. A section of a water and fertiliser supply line 30 is shown in FIG. 10 with a cut away view in FIG. 9.

FIG. 11 shows a view of the supply line 30 from below.

A fertiliser supply line 31 is located above the water supply line 32. The cross-sectional shape of the line is generally circular.

FIG. 12 shows a cross-sectional view of an alternative embodiment wherein the fertiliser supply line 38 is tubular and is located above a tubular water supply line 39 having a part cylindrical duct 40 with apertures 41 and downwardly facing lips 42. The function is similar to the embodiment shown in FIG. 13.

FIG. 13 shows a cross-sectional view of the supply line including a porous cellular foam sleeve 33.

The water supply line has a generally semi-cylindrical outlet duct 34 into which apertures 35 communicate with the interior of the water supply line 32. The duct 34 has a downwardly opening aperture, generally rectangular in plan view. The duct 34 has downwardly facing lips 36 which prevent ingress of soil or other debris into the apertures 35. The duct 34 is self cleaning due to the flow of water from the apertures 35 in use. The duct 34 also serves to prevent ingress of soil into the apertures 35 when the apparatus is installed below the ground surface.

The duct further prevents build up of organic or inorganic matter during prolonged use.

The invention claimed is:

1. A water and fertiliser dispenser capable of simultaneously and sequentially dispensing water and aqueous fertiliser comprising:
   a chamber having a chamber wall which is at least partially water permeable;
   a fertiliser supply line having a fertiliser supply line wall;
   a water supply line having a water supply line wall, the water supply line wall having at least one aperture extending through the water supply line wall;
   the water supply line and the fertiliser supply line being arranged within the chamber; and
   at least one dispensing head having one or more outlets;
   wherein the at least one dispensing head extends through the fertiliser supply line wall and the water permeable chamber wall.

2. The dispenser as claimed in claim 1, wherein the chamber wall comprises a sleeve which includes an open cellular material.

3. The dispenser as claimed in claim 1, wherein the chamber wall comprises a plurality of conduits or porous regions.

4. The dispenser as claimed in claim 1, wherein the chamber wall comprises regions of water impermeable material.

5. The dispenser as claimed in claim 1, wherein the diameter of the fertiliser supply line is in the range from 1 cm to 10 cm.

6. The dispenser as claimed in claim 1, wherein the fertiliser supply line wall includes an elastomeric material.

7. The dispenser as claimed in claim 1, wherein the diameter of the water supply line is in the range from 1 cm to 8 cm.

8. The dispenser as claimed in claim 1, wherein the water supply line wall includes an elastomeric material.

9. The dispenser as claimed in claim 1, wherein the water supply line has a semi-cylindrical outlet duct.

10. The dispenser as claimed in claim 9, wherein the duct has a downwardly opening aperture.

11. The dispenser as claimed in claim 9, wherein the duct has downwardly extending lips.

12. The dispenser as claimed in claim 1, wherein the water supply line and the fertiliser supply line are separated from one another.

13. The dispenser as claimed in claim 1, wherein the water supply line and the fertiliser supply line are separated by a water impermeable barrier.

14. The dispenser as claimed claim 1, further comprising one or more sprinkler adaptors, each configured to connect to a corresponding one of the one or more outlets of the at least one dispensing head, and the one or more sprinkler adaptors each comprising a multiplicity of outlet apertures.

15. The dispenser as claimed in claim 14, wherein the one or more adaptors are of an elongate tubular configuration.

16. The dispenser as claimed in claim 1, wherein the at least one dispensing head extends into the chamber.

17. The dispenser as claimed in claim 14, wherein the at least one dispensing head is arranged to rotate in use.

18. The dispenser as claimed in claim 1, wherein the at least one aperture of the water supply line has a diameter in the range of 0.5 mm to 2 mm.

19. The dispenser as claimed in claim 18, wherein the at least one aperture of the water supply line has a diameter of 1 mm.

20. The dispenser as claimed in claim 1, wherein the at least one aperture of the water supply line is concealed by the wall of the chamber.

21. The dispenser as claimed in claim 1, wherein the at least one aperture of the water supply line is at least partially concealed by the wall of the chamber.

22. An arrangement of water and fertiliser dispensers as claimed in claim 1;
   wherein each of the water supply lines is further connected to a main water supply line;
   and
   wherein each of the fertiliser supply lines is further connected to a main fertiliser supply line.

23. The dispenser as claimed in claim 1, wherein the water supply line is connected to a cistern.

24. The dispenser as claimed in claim 5, wherein the diameter of the fertilizer supply line is in the range of from 2 cm to 8 cm.

25. The dispenser as claimed in claim 7, wherein the diameter of the water supply line is in the range of from 2 cm to 4 cm.

* * * * *